United States Patent
Kovacs et al.

(10) Patent No.: US 12,066,370 B2
(45) Date of Patent: *Aug. 20, 2024

(54) FLOW CELL CARRIER DEVICE

(71) Applicant: Singular Genomics Systems, Inc., San Diego, CA (US)

(72) Inventors: Sandor Kovacs, Middletown, DE (US); Anson Hsu, San Diego, CA (US); David Baranson, Encinitas, CA (US); John Van Doorn, Fallbrook, CA (US); Eli N. Glezer, Del Mar, CA (US)

(73) Assignee: Singular Genomics Systems, Inc., San Diego. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/354,542

(22) Filed: Jul. 18, 2023

(65) Prior Publication Data

US 2023/0384203 A1    Nov. 30, 2023

Related U.S. Application Data

(63) Continuation of application No. 17/105,330, filed on Nov. 25, 2020, now Pat. No. 11,747,262.

(Continued)

(51) Int. Cl.
*G01N 15/1404* (2024.01)
*G01N 15/01* (2024.01)
*G01N 15/14* (2024.01)

(52) U.S. Cl.
CPC ....... *G01N 15/1404* (2013.01); *G01N 15/147* (2013.01); *G01N 2015/014* (2024.01);

(Continued)

(58) Field of Classification Search
CPC ............ G01N 15/1404; G01N 15/147; G01N 2015/014; G01N 2015/1402; G01N 2015/1497

See application file for complete search history.

(56) References Cited

U.S. PATENT DOCUMENTS 5,641,658 A    6/1997 Adams et al.
7,057,026 B2   6/2006 Barnes et al.
(Continued)

FOREIGN PATENT DOCUMENTS

WO    WO-2004/018497 A3    6/2004
WO    WO-2004/018497 A2    3/2007
(Continued)

OTHER PUBLICATIONS

Bentley, D. R. et al. (Nov. 6, 2008). "Accurate whole human genome sequencing using reversible terminator chemistry," *Nature* 456(7218): 53-59.
(Continued)

*Primary Examiner* — Jill A Warden
*Assistant Examiner* — Alex Ramirez
(74) *Attorney, Agent, or Firm* — Mintz, Levin, Cohn, Ferris, Glovsky, Popeo, P.C.; Zachary L. Terranova (57) ABSTRACT

The present disclosure relates to a flow cell carrier. The flow cell carrier may include a flow cell and a frame. The frame may include a pocket and a handle. The pocket may have at least one spring feature and at least one banking feature. The frame may be configured to retain the flow cell within the pocket such that a maximal surface area of the flow cell is exposed to an optical lens. Related methods and kits are also disclosed.

18 Claims, 4 Drawing Sheets

Related U.S. Application Data (60) Provisional application No. 62/952,787, filed on Dec. 23, 2019.

(52) U.S. Cl.
 CPC ............... *G01N 2015/1402* (2013.01); *G01N 2015/1497* (2013.01)

(56) References Cited

U.S. PATENT DOCUMENTS

| | | | |
|---|---|---|---|
| 7,115,400 B1 | 10/2006 | Adessi et al. | |
| 7,541,444 B2 | 6/2009 | Milton et al. | |
| 7,790,418 B2 | 9/2010 | Mayer | |
| 8,003,354 B2 | 8/2011 | Shen et al. | |
| 8,039,817 B2 | 10/2011 | Feng et al. | |
| 8,241,573 B2 | 8/2012 | Banerjee et al. | |
| 8,951,781 B2 | 2/2015 | Reed et al. | |
| 9,937,497 B2 | 4/2018 | Eltoukhy et al. | |
| 10,738,072 B1 | 8/2020 | Graham et al. | |
| 11,747,262 B2* | 9/2023 | Kovacs | G01N 15/147 436/63 |
| 2004/0091395 A1* | 5/2004 | Ward | B01L 9/52 422/63 |
| 2004/0223890 A1* | 11/2004 | Summers | B01L 9/52 422/400 |
| 2008/0009420 A1 | 1/2008 | Schroth et al. | |
| 2009/0026082 A1 | 1/2009 | Rothberg et al. | |
| 2010/0111768 A1* | 5/2010 | Banerjee | B01L 9/527 422/82.08 |
| 2011/0059865 A1 | 3/2011 | Smith et al. | |
| 2012/0270305 A1 | 10/2012 | Reed et al. | |
| 2019/0076847 A1* | 3/2019 | Donovan | G01N 15/1433 |
| 2021/0187512 A1 | 6/2021 | Kovacs et al. | |

FOREIGN PATENT DOCUMENTS

| | | | |
|---|---|---|---|
| WO | WO-2007/123744 A2 | 11/2007 | |
| WO | WO-2007/123744 A3 | 11/2008 | |
| WO | WO-2012/096703 A1 | 7/2012 | |
| WO | WO-2012096703 A1 * | 7/2012 | ........ B01L 3/502715 |

OTHER PUBLICATIONS

Margulies, M. et al. (Sep. 15, 2005, e-published Jul. 31, 2005). "Genome sequencing in microfabricated high-density picolitre reactors," *Nature* 437(7057): 376-380.

Pourmand, N. et al. (Apr. 25, 2006, e-published Apr. 13, 2006). "Direct electrical detection of DNA synthesis," *Proceedings of the National Academy of Sciences* 103(17): 6466-64 70.

Shendure, J. et al. (Sep. 9, 2005, e-published Aug. 4, 2005). "Accurate multiplex polony sequencing of an evolved bacterial genome," *Science* 309(5741): 1728-1732.

Southern, E. et al. (Jan. 1999). "Molecular interactions on microarrays," *Nature genetics* 21(1): 5-9.

\* cited by examiner

FLOW CELL CARRIER DEVICE

CROSS-REFERENCES TO RELATED APPLICATIONS

This application is a continuation of U.S. patent application Ser. No. 17/105,330, filed Nov. 25, 2020, which claims the benefit of U.S. Provisional Application No. 62/952,787, filed Dec. 23, 2019, which is incorporated herein by reference in its entirety and for all purposes.

BACKGROUND

A tremendous interest in nucleic acid characterization tools was spurred by the mapping and sequencing of the human genome. New tools were needed to cope with the unprecedented amount of genomic information that was being discovered. One such tool that emerged were DNA microarrays; tiny gene-based sensors traditionally prepared on coated glass microscope slides (Southern E., Mir K., and Shchepinov M.; Nature Genetics volume 21, p. 5-9 (1999)). A typical DNA microarray included a flat, solid substrate (typically glass) with an organic coating, typically an organo-functional alkoxysilane. The coated glass is grafted with various known DNA probes at predefined locations. Standard 25 mm×75 mm glass microscope slides were the first supports commonly used for these initial microarray assays, which then gave way to the modern flow cell.

Broadly speaking, for nucleic acid sequencing applications, a flow cell may be considered a reaction chamber that contains one or more nucleic acid templates tethered to a solid support, to which nucleotides and ancillary reagents are iteratively applied and washed away. The flow cell allows for imaging of the sites at which the nucleic acids are bound, and resulting image data is used for the desired analysis. The latest commercial sequencing instruments use flow cells and massive parallelization to increase sequencing capacity.

There is a desire to perform high throughput sequencing stemming from the need for faster processing and reduced costs. Since the debut of the modern flow cell (Margulies et al; Nature. 2005 Sep. 15; 437(7057):376-80. 2005), improvements to sequencing flow cells tend to focus on optimizing spacing patterns and uniform well size as a means to improve sequencing quality and efficiency. In addition to these improvements, there is a general need for a more user-friendly, ergonomically minded, flow cell carrier that reduces costs relative to other known systems and also increases control and efficiency of the reactions intended to be observed. There is, therefore, a continued need for improved methods and devices for sequencing nucleic acid in order to address the practical day-to-day sequencing work of the average scientist.

BRIEF SUMMARY

In an aspect, a flow cell carrier is provided. The flow cell carrier includes a flow cell and a frame. The frame includes a handle, and the frame is configured to retain the flow cell.

In another interrelated aspect, a method of manufacturing a flow cell carrier is provided. The method includes forming a frame such that the frame includes a handle, and securing a flow cell within the frame.

In some variations, one or more of the following features may optionally be included in any feasible combination.

The frame can further include a pocket, and the pocket can include at least one biasing feature. The frame can be configured to retain the flow cell within the pocket. The frame can be configured to retain the flow cell within the pocket such that a maximal surface area of the flow cell can be available to be exposed to an optical lens 167 (e.g., the optical lens of a nucleic acid sequencing device). The optical lens (e.g., the optical lens of the sequencing device) can be configured to detect excitation, emission, or other signals present on the flow cell. The frame can be configured to retain the flow cell within the pocket such that a maximal surface area of the flow cell can be available to be in contact with the receiver of a nucleic acid sequencer. The retaining of the flow cell within the pocket further can include constraining a first, a second, a third, a fourth, a fifth, and a sixth degree of freedom of the flow cell. The frame can be an injection molded frame. The handle can be a raised handle. The frame can be further configured to provide a gap between a work surface and the flow cell. The frame further can include at least one ferromagnetic pin. The at least one biasing feature can be a spring finger. The at least one biasing feature can be a tab. The flow cell can further include a microchip 165. The microchip can be an electronically erasable programmable read only memory (EEPROM) chip.

The forming of the frame can include injection molding. The forming can include assembling individual components. The handle can be a raised handle. The handle can be an ergonomic handle. The frame can be further configured to provide a gap between a work surface and the flow cell. The method can further include forming a housing within the frame. The housing can be configured to contain a microchip.

In an aspect is provided a method of amplifying and sequencing DNA within a flow cell. The method includes providing a flow cell carrier as described herein and positioning the flow cell carrier within a nucleic acid sequencing device. The method also includes flowing a first aqueous solution that includes one or more reagents and enzymes for DNA amplification through the flow channel. In embodiments, the method includes one or more wash cycles. In embodiments, the method includes flowing a sequencing solution through the flow channel that includes one or more reagents and enzymes for DNA sequencing.

In another aspect is provided a kit, wherein the kit includes a flow cell carrier as described herein. In embodiments, the flow cell carrier includes a flow cell.

DETAILED DESCRIPTION

Grasping and lifting a flat object from a surface (e.g., a microscope slide on a table top) is an ongoing research topic, especially in the field of robotics. Robotics and automation are currently used in the field of life sciences to aid in performing large-scale and/or high-throughput sequencing of proteins, DNA, and the like. Even for humans with ample dexterity and control, manipulating traditional sequencing flow cells, i.e. a glass slide containing small fluidic channels, is challenging and if not performed properly, expensive mishaps can occur. Incorporating an ergonomically designed frame, which includes a raised handle, allows for greater access and enables the user to manipulate the flow cell without the risk of dropping or breaking the sensitive reaction chamber.

Disclosed herein is a flow cell carrier that is configured to be ergonomically used to grasp, lift, or otherwise support a flow cell. In an aspect is provided a flow cell carrier including a frame that includes a handle; wherein the frame is configured to retain a flow cell. The flow cell carrier has a support platform that supports the flow cell and a handle that can be grasped by a user to lift and transport a flow cell mounted on the support platform. The support platform lifts the flow cell above a work surface and reduces possible contamination to the flow cell. The handle significantly reduces the risk of damaging the flow cell by squeezing, scratching, dropping, or otherwise disfiguring the flow cell by hand. Additionally, because flow cells are often used in repetitive tasks, the ergonomic handle reduces risk of injury to a user from prolonged repetitive motion. Workflow efficiency can also be improved when using the flow cell carrier, as the flow cell can be transported quickly and safely between surfaces with minimal damage to the flow cell. In embodiments, the flow cell carrier is configured to removably engage within a nucleic acid sequencing device. The term "removably engage" describe a relationship between the flow cell carrier and a receiving unit of a bioanalytical device, or interface of a bioanalytical device (e.g., platen receiver of a nucleic acid sequencing system), and is intended to mean that a connection between the flow cell carrier and the receiving unit of a bioanalytical device is readily separable without destroying the receiving unit of a bioanalytical device.

Figure 1A:
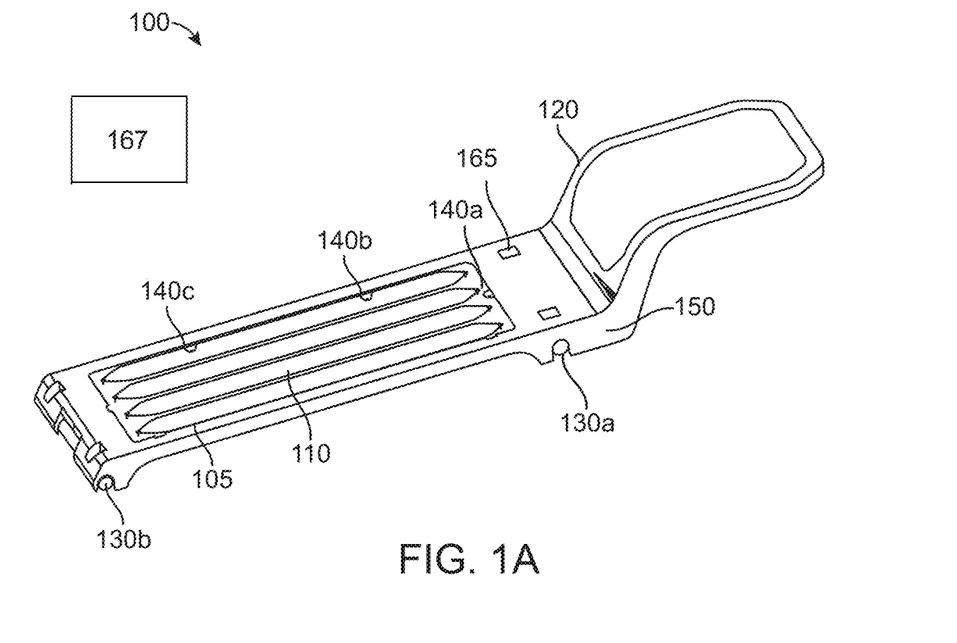
FIG. 1A is a top perspective view of an embodiment of a flow cell carrier consistent with implementations of the current subject matter.
Figure 1B:
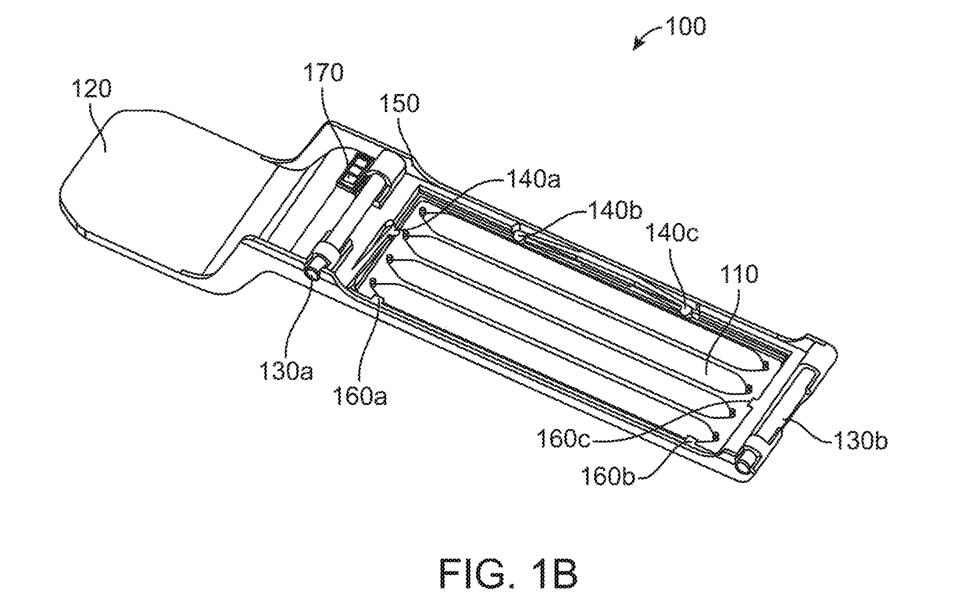
FIG. 1B is a bottom perspective view of the flow cell carrier of FIG. 1A.
Figure 1C:
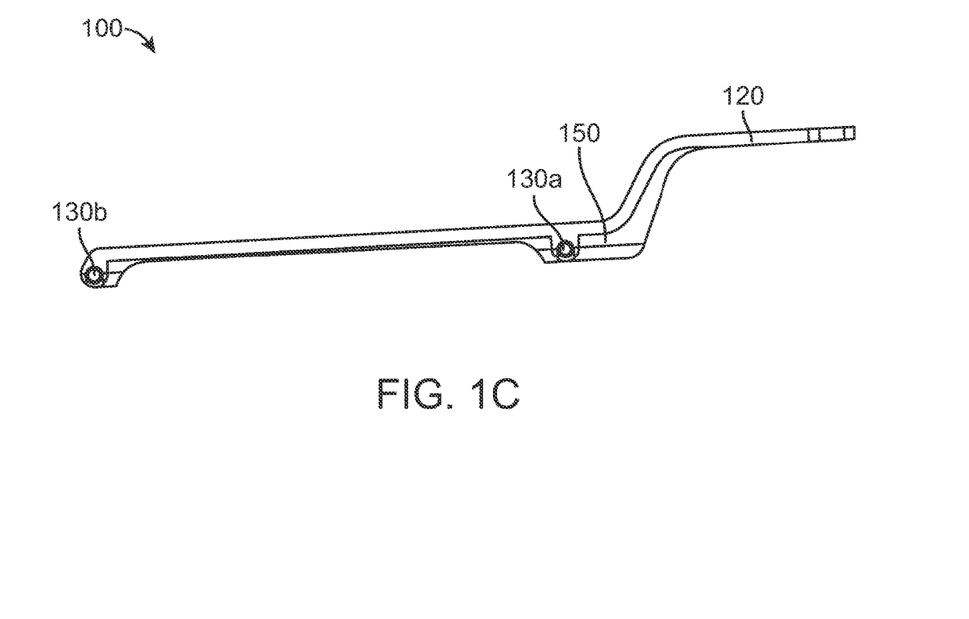
FIG. 1C is a side view of the flow cell carrier of FIG. 1A.

FIGS. 1A-1C illustrate an embodiment of a flow cell carrier 100. The flow cell carrier 100 can include or support a flow cell 110 and a frame 150, the frame 150 including a pocket 105 configured to retain the flow cell 110. In embodiments, the frame 150 can further include an appendage or handle 120. For example, the handle 120 may have an ergonomic shape. An ergonomic shape can act to alleviate or prevent pain, or other undesirable effects, associated with the repetitive hand motions involved in the daily sequencing work of a scientist. An ergonomic shape can also allow for greater digit (i.e. finger) access and enables the user to manipulate the flow cell without the risk of damage or contamination. The pocket 105 acts as a platform or other structure that supports and aids in retaining the flow cell 110 in place, such as for transport. In this regard, the pocket 105 can be a platform sized and shaped to support the flow cell 110 in a horizontal orientation. The handle 120 extends from the pocket 105, such as in an upward and outward direction and includes a portion that can be grasped by a user, such as by a single hand of the user. In embodiments, the flow cell carrier 100 includes an identifying feature such as a label, logo, lot number, or a unique identifying number. The handle may include an identifying feature, such as a label, logo, lot number, or a unique identifying number. It should be appreciated that the shape of the flow cell carrier 100 shown in FIGS. 1A-1C is an example and that the shape can vary. The handle can be of varying widths, lengths, and shapes. In one embodiment, the elongated handle is an ergonomically designed structure to fit comfortably in a user's hand. The handle can be made of various materials known in the art. In embodiments, the handle is injection molded or assembled by hand and permanently affixed to the frame. The handle can be provided in various sizes, including small, medium, and large sizes to accommodate all hand sizes, including male, female, adult, adolescent, and small hand sizes. The handle can be of various colors and aesthetic designs. In certain embodiments, the handle can have finger grooves, and/or gripping materials deposited thereon.

The frame 150 can include or be coupled to one or more retaining or positioning components that are configured to retain the flow cell 110 in place when the flow cell 110 is positioned in the pocket 105 when on a platen receiver of a bioanalytical instrument (e.g., a nucleic acid sequencer platen). The retaining components are configured to retain and/or position the flow cell 110 in place or otherwise reduce the likelihood that the flow cell 110 will disengage from the pocket 105 when on a platen receiver of a bioanalytical instrument. For example, the frame 150 can be configured to retain the flow cell 110 within the pocket 105 such that a maximal surface area of the flow cell 110 is in contact with the pocket 105 on a platen receiver of a bioanalytical instrument. Some examples of such retaining or positioning components include pins, hooks, posts, or clips. In embodiments, the frame 150 can further include a proximal ferromagnetic pin 130a and a distal ferromagnetic pin 130b. In embodiments, the ferromagnetic pin includes iron, cobalt, or nickel, or oxides thereof. In embodiments, the ferromagnetic pin is an alloy containing a transition metal (e.g., Fe, Co, or Ni) and a metalloid (e.g., B, C, Si, P or Al). In embodiments, the frame 150 can further include a proximal magnetic pin 130a and a distal magnetic pin 130b. In embodiments, the frame 150 can further include a proximal steel pin 130a and a distal steel pin 130b. In some embodiments, the proximal steel pin 130a and the distal steel pin 130b further comprise a nickel coating or nickel alloy coating. The pins 130 can be located at opposite ends of the pocket 105. For example, the pin 130a is located at or near the handle 150 while the pin 130b is located at an opposite end of the pocket 105. The positions, size, shape and material of the pins can vary.

In example embodiments, the frame 150 can further include a proximal spring finger 140a positioned along a first length or short edge of the pocket 105. For example, the short edge of the pocket 105 can be perpendicular to a second length or long edge of the pocket 105. A distal spring finger 140b and a distalmost spring finger 140c can be positioned along the long edge of the pocket 105. In embodiments, the proximal spring finger 140a, the distal spring finger 140b, and the distalmost spring finger 140c can be molded into the frame 150 to positively locate the flow cell 110 in the pocket 105. In the illustrated embodiment, the spring fingers 140 comprise structures that extend outwardly from the frame toward the pocket 105. The spring fingers engage, abut, or otherwise press against a flow cell 110 mounted on the pocket 105 such as to retain the flow cell in place or to assist in properly positioning the flow cell. It should be appreciated the structure of the spring fingers can vary and can be any type of spring or biasing member that exerts a force onto the flow cell 110 to retain or position the flow cell.

For example, the flow cell 110 can be positively located on the frame by biasing the flow cell 110 toward a proximal banking tab 160a and a distal banking tab 160b positioned along a long edge of the pocket 105 opposite the long edge of the pocket 105 containing the distal spring finger 140b and the distalmost spring finger 140c, as depicted in FIG. 1B. The flow cell 110 is biased toward a distalmost banking tab 160c positioned along a short edge of the pocket 105 opposite the short edge containing the proximal spring finger 140a The pocket 105 defines multiple contact points (such as three contact points) for the plane of the flow cell 110. The pocket can constrain the flow cell 110 in multiple degrees of freedom, such as six degrees of freedom. Constraining is used in accordance with its ordinary meaning in the art and refers to partially restricted movement or complete immobilization. Six degrees of freedom refers to the freedom of movement of the flow cell 110 in a three-dimensional space. Specifically, the flow cell 110 is free to move along and rotate around three perpendicular X-, Y-, and Z-axes. A first degree of freedom can be defined as moving left and right along the X-axis. A second degree of freedom can be defined as moving backward and forward along the Y-axis. A third degree of freedom can be defined as moving up and down along the Z-axis. A fourth degree of freedom can be defined as rotating around the X-axis, or "roll." A fifth degree of freedom can be defined as rotating around the Y-axis, or "pitch." A sixth degree of freedom can be defined as rotating around the Z-axis, or "yaw." The pocket 105 or other component of the frame can constrain the flow cell 110 in one or more of these degrees of freedom. The purpose of the pocket 105 plane and the proximal spring finger 140a and distal spring finger 140b is to fully constrain the flow cell 110 in all six degrees of freedom.

FIG. 1B is a bottom perspective view of the flow cell carrier 100 of FIG. 1A. As described above and shown in FIG. 1B, the proximal banking tab 160a and the distal banking tab 160b are located along a long edge of the pocket 105, and a distalmost banking tab 160c is located along a short edge of the pocket 105. In embodiments, the flow cell carrier 100 can also include an electronically erasable programmable read only memory (EEPROM) chip 170. For example, the EEPROM chip 170 can be affixed in a pocket, other structure molded into the frame 150, or directly to the frame 150 itself. In embodiments, the EEPROM chip 170 can serve two functions; first, to store identifying information (e.g., lot numbers, sample run, etc.), and second, to provide positive feedback that the flow cell 110 has been inserted correctly into the pocket 105. This is in contrast to alternative sequencing flow cell cartridges, which typically employ a single radio frequency identification (RFID) tag (Eltoukhy et al.). The flow cell carrier 100 described herein, including embodiments, can be configured such that the EEPROM chip 170 cannot make contact with electronic components of another device or instrument unless the flow cell 110 is fully seated in the device in a proper location and orientation. Optionally, the flow cell carrier 100 can include an EEPROM chip 170 and a RFID tag. Also shown in FIG. 1B are the proximal steel pin 130a and the distal steel pin 130b.

FIG. 1C is a side view of the flow cell carrier 100, showing the frame 150 with the handle 120, and the proximal steel pin 130a and the distal steel pin 130b. As shown in FIG. 1C, in embodiments the frame 150 can provide a gap between the flow cell 110 and a surface on which the flow cell carrier 100 sits. By including a gap between the flow cell 110 and the surface, it is possible to mitigate damage to the flow cell 110, reduce potential contamination of the flow cell 110, and enable more efficient processing due to the ease with which the flow cell 110 can be removed from the surface. In embodiments, the gap can be about 1 mm to about 10 mm. In embodiments, the gap is about 2.5 mm. In embodiments, the gap is about 5 mm. In embodiments, the gap is about 7.5 mm. In embodiments, when the flow cell carrier is positioned on the bioanalytical device receiver (e.g., the platen of a nucleic acid sequencing instrument), the receiver complements the flow cell carrier such that the gap is reduced, minimized, or eliminated and the flow cell is in direct contact with the platen. In embodiments, the flow cell is in direct contact with the receiver of the sequencing device. The receiver may include a thermal element, which is configured to transfer or absorb thermal energy of the fluid in the flow cell channel.

Figure 2:
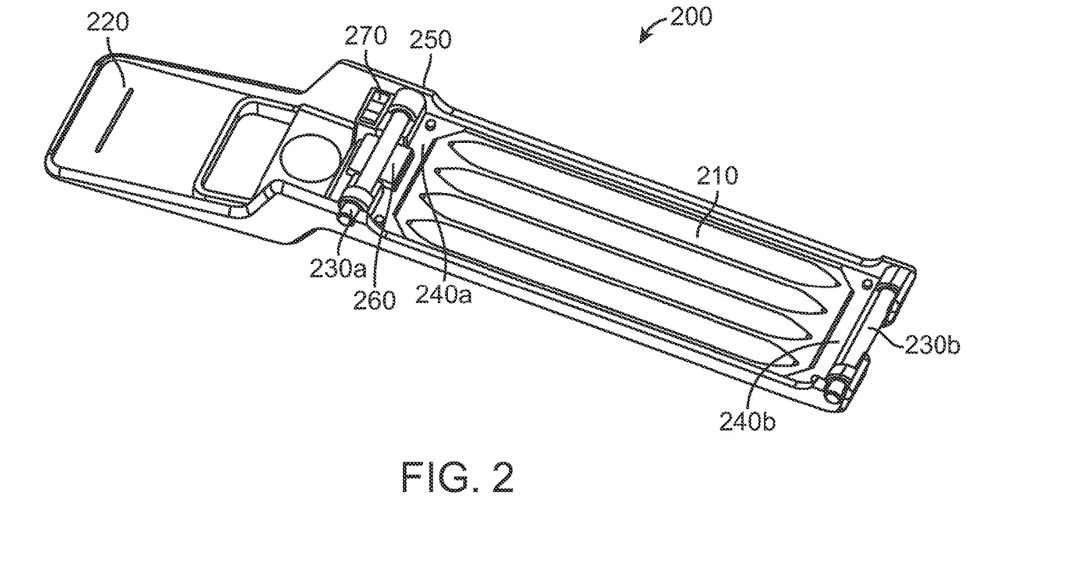
FIG. 2 is a bottom perspective view of another embodiment of a flow cell carrier consistent with implementations of the current subject matter.

FIG. 2 is a bottom perspective view of another embodiment of a flow cell carrier 200. The flow cell carrier 200 can include or support a flow cell 210 and a frame 250, the frame 250 including a pocket configured to retain the flow cell 210. For example, the flow cell 210 can be positively located on the frame 250 by biasing the flow cell 210 toward the frame 250 via a proximal biasing feature positioned along a short edge of the pocket. For example, depicted in FIG. 2, the biasing features are underneath the tabs 240a and 240b. The tabs 240a and 240b may be made of any appropriate material, such as plastic or metal. In some embodiments, the proximal biasing feature underneath 240a and the distal biasing feature underneath 240b comprise plates, springs, or tabs. For example, the proximal biasing feature underneath 240a and the distal biasing feature underneath 240b can comprise a metal or rigid polymer. In embodiments, the tabs 240a and 240b can have a thickness in the range of about 0.05 mm to about 0.5 mm. In embodiments, the tabs 240a and 240b can have a thickness of about 0.1 mm. In embodiments, the tabs 240a and 240b can have a thickness of about 0.25 mm. The tabs 240a and 240b can be affixed to the frame 250 via heat staking, ultrasonic peening, or other suitable methods. Additionally, the flow cell carrier 200 can include a retaining feature 260, such as a wedge or block, configured to retain the tab 240a. The retaining feature 260 may be removable, or may be permanently affixed to the frame 250. The flow cell may be removed from the flow cell carrier, for example when the wedge 260 is present the flow cell (e.g., the glass slide containing one or more channels) may be removed and a new flow cell may be inserted into the carrier. Alternatively, the flow cell may not be removed from the flow cell carrier, for example heat staking the tabs 240a and 240b prevents reuse of the flow cell carrier. In embodiments, the frame 250 can further include an appendage or handle 220 and/or an EEPROM chip 270.

Figure 3:
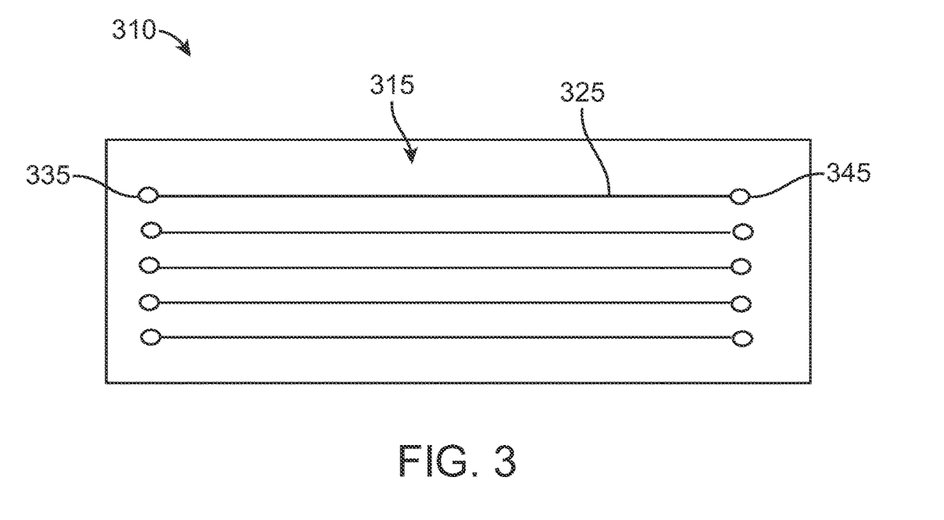
FIG. 3 is a block diagram of another embodiment of a flow cell consistent with implementations of the current subject matter.

FIG. 3 is a block diagram of an embodiment of a flow cell 310. The flow cell 310 can include a substrate 315 having at least one channel 325. The flow cell 310 can be used in a flow cytometer or similar instrument, and may be used for cell counting and/or analysis, spectroscopy, immunoassays, genetic sequencing, DNA sequencing, protein sequencing, scattering, particle counting, flow visualization, or the like. In embodiments, the flow cell 310 can be used in a nucleic acid sequencing system (or nucleic acid sequencer) configured for various applications, including de novo sequencing, sequencing of whole genomes, or target genomic regions, or metagenomics. In embodiments, the at least one channel 325 can be a microfluidic channel configured to allow a material to flow therethrough. The flow cell may include a plurality of inlet ports sized to receive a flow of reagent into the flow cell and a plurality of outlet ports that pass the flow of reagent out of the flow cell. A flow channel of the flow cell is positioned between, and in fluid communication with, each inlet port and the outlet port. The terms "fluid communication" or "fluidically coupled" refers to two spatial regions being connected together such that a liquid or gas may flow between the two spatial regions. In embodiments, the at least one channel 325 can be a reaction channel configured to subject a material within the at least one channel 325 to a desired chemical or physical reaction. In embodiments, the at least one channel 325 is a visualization channel configured to observe or record physical or chemical properties of a material within the at least one channel 325. For example, the at least one channel 325 can be formed on the substrate 315 by etching, engraving, cutting, or other similar means suited to the materials used in the substrate 315 and the desired characteristics of the at least one channel 325. In embodiments, each of the at least one channel 325 can have an input 335 and an output 345. For example, the input 335 can be configured to allow a stream of cells to enter the at least one channel 325, flow through the at least one channel 325, and exit the at least one channel 325 via the at least one output 345.

Figure 4A:
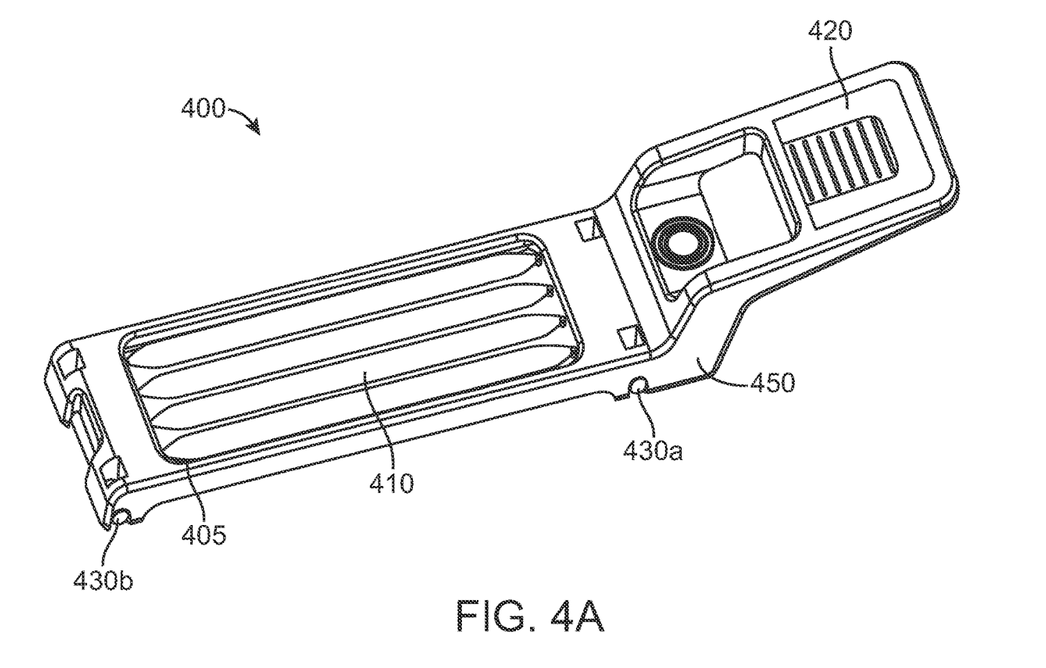
FIG. 4A is a top perspective view of another embodiment of a flow cell carrier consistent with implementations of the current subject matter.
Figure 4B:
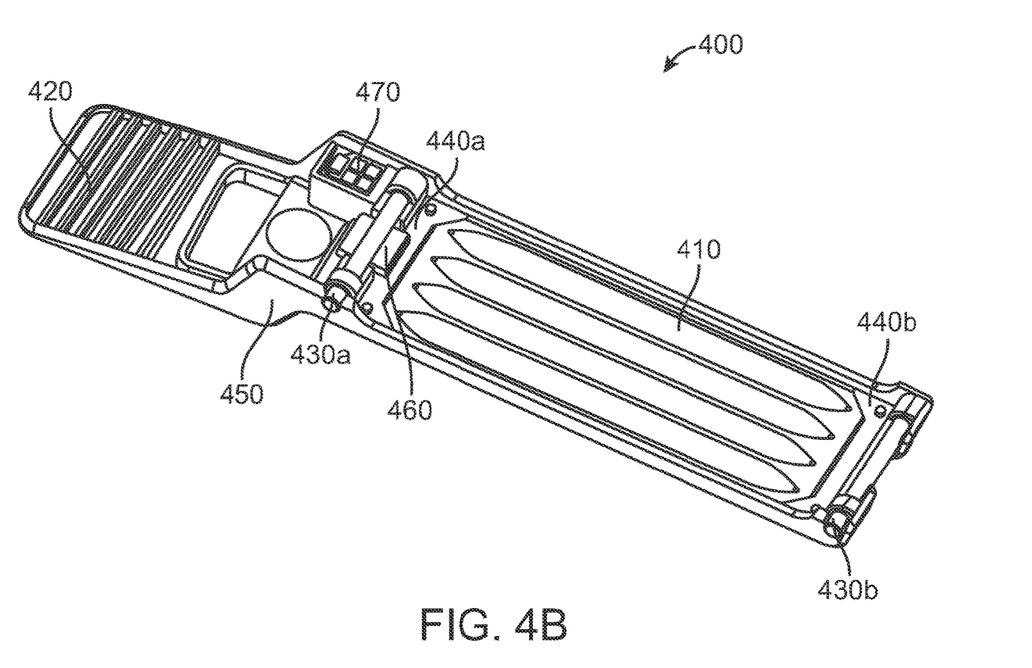
FIG. 4B is a bottom perspective view of the flow cell carrier of FIG. 4A.

FIGS. 4A-4B illustrate another embodiment of a flow cell carrier 400. The flow cell carrier 400 can include or support at least one flow cell 410 and a frame 450, the frame 450 including a pocket 405 configured to retain the flow cell 410. In embodiments, the frame 450 can further include an appendage or handle 420. For example, the handle 420 may have an ergonomic shape and design elements as described above. The handle 420 may include ridges, as shown in FIG. 4A, or other texture such as grooves, indentations, rippling, stippling, or the like, to improve grip. The pocket 405 acts as a platform or other structure that supports and aids in retaining the flow cell 410 in place, such as for transport. In this regard, the pocket 405 can be a platform sized and shaped to support the flow cell 410 in a horizontal orientation. The handle 420 extends from the pocket 405, such as in an upward and outward direction and includes a portion that can be grasped by a user, such as by a single hand of the user. In embodiments, the flow cell carrier 400 includes an identifying feature such as a label, logo, lot number, or a unique identifying number. The handle may include an identifying feature, such as a label, logo, lot number, or a unique identifying number. It should be appreciated that the shape of the flow cell carrier 400 shown in FIGS. 4A-4B is an example and that the shape can vary.

The frame 450 can include or be coupled to one or more retaining or positioning components that are configured to retain the flow cell 410 in place when the flow cell 410 is positioned in the pocket 405 when on a platen receiver of a bioanalytical instrument (e.g., a nucleic acid sequencer platen). The retaining components are configured to retain and/or position the flow cell 410 in place or otherwise reduce the likelihood that the flow cell 410 will disengage from the pocket 405. For example, the frame 450 can be configured to retain the flow cell 410 within the pocket 405 such that a maximal surface area of the flow cell 410 is in contact with the platen receiver of a bioanalytical instrument (e.g., a nucleic acid sequencer platen. In embodiments, the frame 450 can further include a proximal ferromagnetic pin 430a and a distal ferromagnetic pin 430b. In embodiments, the ferromagnetic pin includes iron, cobalt, or nickel, or oxides thereof. In embodiments, the ferromagnetic pin is an alloy containing a transition metal (e.g., Fe, Co, or Ni) and a metalloid (e.g., B, C, Si, P or Al). In embodiments, the frame 450 can further include a proximal magnetic pin 430a and a distal magnetic pin 430b. In embodiments, the frame 450 can further include a proximal steel pin 430a and a distal steel pin 430b. In some embodiments, the proximal steel pin 430a and the distal steel pin 430b further comprise a nickel coating or nickel alloy coating. The pins 430a and 430b can be located at opposite ends of the pocket 405. For example, the pin 430a is located at or near the handle 450 while the pin 430b is located at an opposite end of the pocket 405. The positions, size, shape and material of the pins can vary.

In example embodiments, the flow cell 410 can be positively located on the frame 450 by biasing the flow cell 410 toward the frame 450 via a proximal biasing feature positioned along a short edge of the pocket 405. For example, depicted in FIG. 4B, the biasing features are underneath the tabs 440a and 440b. The biasing features aid in positioning the flow cell in the X and Y directions. The tabs 440a and 440b may be made of any appropriate material, such as plastic or metal. In some embodiments, the proximal biasing feature underneath tab 440a and the distal biasing feature underneath tab 440b comprise plates, springs, or tabs. For example, there may be a proximal bump in the molded plastic frame 450 and a distal metal leaf spring under tab 440b to create a Y-direction bias. The proximal biasing feature underneath tab 440a and the distal biasing feature underneath tab 440b can comprise a metal or rigid polymer. In embodiments, the tabs 440a and 440b can have a thickness in the range of about 0.05 mm to about 0.5 mm. In embodiments, the tabs 440a and 440b can have a thickness of about 0.1 mm. In embodiments, the tabs 440a and 440b can have a thickness of about 0.25 mm. The tabs 440a and 440b can be affixed to the frame 450 via heat staking, ultrasonic peening, or other suitable methods. Additionally, the flow cell carrier 400 can include a retaining feature 460, such as a wedge or block, configured to retain the tab 440a. The retaining feature 460 may be removable, or may be permanently affixed to the frame 450. In embodiments, the frame 450 can further include an appendage or handle 420 and/or an EEPROM chip 470. In embodiments, such as that shown in FIG. 4B, the EEPROM chip 470 may be recessed in the frame 450.

FIG. 4B is a bottom perspective view of the flow cell carrier 400 of FIG. 4A. In embodiments, the flow cell carrier 400 can also include an electronically erasable programmable read only memory (EEPROM) chip 470. For example, the EEPROM chip 470 can be affixed in a pocket 475, other structure molded into the frame 450, or recessed directly to the frame 450 itself. In embodiments, the EEPROM chip 470 can serve at least two functions; first, to store identifying information (e.g., lot numbers, sample run, date of manufacture, etc.), and second, to provide positive feedback that the flow cell 410 has been inserted correctly into the pocket 405. Additionally, the EEPROM chip 470 can provide instructions or protocols to the sequencing device. This is in contrast to alternative sequencing flow cell cartridges, which typically employ a single radio frequency identification (RFID) tag (Eltoukhy et al.), and avoids the use of antennas, receivers, or additional power sources. The flow cell carrier 400 described herein, including embodiments, can be configured such that the EEPROM chip 470 (alternatively referred to as 170 in FIG. 1B or 270 in FIG. 2) cannot make contact with electronic components of another device or instrument unless the flow cell 410 is fully seated in the device in a proper location and orientation. Optionally, the flow cell carrier 400 can include both an EEPROM chip 470 and a RFID tag. Also shown in FIG. 4B are the proximal steel pin 430a and the distal steel pin 430b.

In an aspect is provided a method of amplifying and sequencing DNA within a flow cell. The method includes providing a flow cell carrier as described herein and positioning the flow cell carrier within a nucleic acid sequencing device. In embodiments, the method of sequencing a nucleic acid includes providing a flow cell carrier as described herein, wherein the flow cell is configured to serve as a reaction vessel in a nucleic acid sequencing device; positioning the flow cell carrier on the receiver of a nucleic acid sequencing device wherein the flow cell is exposed to an optical lens; and conducting a plurality of sequencing events and detecting the sequencing events (e.g., a sequencing event as described herein) using the optical lens, thereby sequencing a nucleic acid.

In embodiments, the method includes amplification methodologies described herein or known in the art. Suitable methods for amplification include, but are not limited to, the polymerase chain reaction (PCR), strand displacement amplification (SDA), transcription mediated amplification (TMA) and nucleic acid sequence based amplification (NASBA), for example, as described in U.S. Pat. No. 8,003,354, which is incorporated herein by reference in its entirety. In embodiments, amplifying includes thermal bridge polymerase chain reaction amplification; for example, as exemplified by the disclosures of U.S. Pat. Nos. 5,641,658; 7,115,400; 7,790,418; U.S. 2008/0009420, each of which is incorporated herein by reference in its entirety. The above amplification methods can be employed to amplify one or more nucleic acids of interest within a flow cell. For example, PCR, multiplex PCR, SDA, TMA, NASBA and the like can be utilized to amplify immobilized nucleic acid fragments within a flow cell.

A nucleic acid can be amplified by a thermocycling method or by an isothermal amplification method. In some embodiments a rolling circle amplification method is used. In some embodiments, amplification takes place on a solid support (e.g., within a flow cell) where a nucleic acid, nucleic acid library or portion thereof is immobilized. In certain sequencing methods, a nucleic acid library is added to a flow cell and immobilized by hybridization to anchors under suitable conditions. This type of nucleic acid amplification is often referred to as solid phase amplification. In some embodiments of solid phase amplification, all or a portion of the amplified products are synthesized by an extension initiating from an immobilized primer. Solid phase amplification reactions are analogous to standard solution phase amplifications except that at least one of the amplification oligonucleotides (e.g., primers) is immobilized on a solid support.

Nucleic acid sequencing systems utilize excitation beams to excite labeled nucleotides in the DNA containing sample to enable analysis of the base pairs present within the DNA. Many of the next-generation sequencing (NGS) technologies use a form of sequencing by synthesis (SBS), wherein modified nucleotides are used along with an enzyme to read the sequence of DNA templates in a controlled manner. In embodiments, sequencing includes a sequencing by synthesis event, where individual nucleotides are identified iteratively (e.g., incorporated and detected into a growing complementary strand), as they are polymerized to form a growing complementary strand. In embodiments, nucleotides added to a growing complementary strand include both a label and a reversible chain terminator that prevents further extension, such that the nucleotide may be identified by the label before removing the terminator to add and identify a further nucleotide. Such reversible chain terminators include removable 3' blocking groups, for example as described in U.S. Pat. Nos. 10,738,072, 7,541,444 and 7,057,026. Once such a modified nucleotide has been incorporated into the growing polynucleotide chain complementary to the region of the template being sequenced, there is no free 3'-OH group available to direct further sequence extension and therefore the polymerase cannot add further nucleotides. Once the identity of the base incorporated into the growing chain has been determined, the 3' reversible terminator may be removed to allow addition of the next successive nucleotide. In embodiments, the nucleic acid sequencing system utilizes the detection of four different nucleotides that comprise four different labels.

I. Definitions

All patents, patent applications, articles and publications mentioned herein, both supra and infra, are hereby expressly incorporated herein by reference in their entireties.

Unless defined otherwise herein, all technical and scientific terms used herein have the same meaning as commonly understood by one of ordinary skill in the art to which this disclosure belongs. Various scientific dictionaries that include the terms included herein are well known and available to those in the art. Although any methods and materials similar or equivalent to those described herein find use in the practice or testing of the disclosure, some preferred methods and materials are described. Accordingly, the terms defined immediately below are more fully described by reference to the specification as a whole. It is to be understood that this disclosure is not limited to the particular methodology, protocols, and reagents described, as these may vary, depending upon the context in which they are used by those of skill in the art.

As used herein, the singular terms "a", "an", and "the" include the plural reference unless the context clearly indicates otherwise.

Reference throughout this specification to, for example, "one embodiment", "an embodiment", "another embodiment", "a particular embodiment", "a related embodiment", "a certain embodiment", "an additional embodiment", or "a further embodiment" or combinations thereof means that a particular feature, structure or characteristic described in connection with the embodiment is included in at least one embodiment of the present disclosure. Thus, the appearances of the foregoing phrases in various places throughout this specification are not necessarily all referring to the same embodiment. Furthermore, the particular features, structures, or characteristics may be combined in any suitable manner in one or more embodiments.

As used herein, the term "about" means a range of values including the specified value, which a person of ordinary skill in the art would consider reasonably similar to the specified value. In embodiments, the term "about" means within a standard deviation using measurements generally acceptable in the art. In embodiments, about means a range extending to +/−10% of the specified value. In embodiments, about means the specified value.

Throughout this specification, unless the context requires otherwise, the words "comprise", "comprises" and "comprising" will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that no other elements are optional and may or may not be present depending upon whether or not they affect the activity or action of the listed elements.

As used herein, the term "nucleic acid" refers to nucleotides (e.g., deoxyribonucleotides or ribonucleotides) and polymers thereof in either single-, double- or multiple-stranded form, or complements thereof. The terms "polynucleotide," "oligonucleotide," "oligo" or the like refer, in the usual and customary sense, to a sequence of nucleotides. The term "nucleotide" refers, in the usual and customary sense, to a single unit of a polynucleotide, i.e., a monomer. Nucleotides can be ribonucleotides, deoxyribonucleotides, or modified versions thereof. Examples of polynucleotides contemplated herein include single and double stranded DNA, single and double stranded RNA, and hybrid molecules having mixtures of single and double stranded DNA and RNA with linear or circular framework. Non-limiting examples of polynucleotides include a gene, a gene fragment, an exon, an intron, intergenic DNA (including, without limitation, heterochromatic DNA), messenger RNA (mRNA), transfer RNA, ribosomal RNA, a ribozyme, cDNA, a recombinant polynucleotide, a branched polynucleotide, a plasmid, a vector, isolated DNA of a sequence, isolated RNA of a sequence, a nucleic acid probe, and a primer. Polynucleotides useful in the methods of the disclosure may comprise natural nucleic acid sequences and variants thereof, artificial nucleic acid sequences, or a combination of such sequences.

A polynucleotide is typically composed of a specific sequence of four nucleotide bases: adenine (A); cytosine (C); guanine (G); and thymine (T) (uracil (U) for thymine (T) when the polynucleotide is RNA). Thus, the term "polynucleotide sequence" is the alphabetical representation of a polynucleotide molecule; alternatively, the term may be applied to the polynucleotide molecule itself. This alphabetical representation can be input into databases in a computer having a central processing unit and used for bioinformatics applications such as functional genomics and homology searching. Polynucleotides may optionally include one or more non-standard nucleotide(s), nucleotide analog(s) and/or modified nucleotides.

As used herein, the term "polynucleotide template" refers to any polynucleotide molecule that may be bound by a polymerase and utilized as a template for nucleic acid synthesis. As used herein, the term "polynucleotide primer" refers to any polynucleotide molecule that may hybridize to a polynucleotide template, be bound by a polymerase, and be extended in a template-directed process for nucleic acid synthesis, such as in a PCR or sequencing reaction. Polynucleotide primers attached to a core polymer within a core are referred to as "core polynucleotide primers."

In general, the term "target polynucleotide" refers to a nucleic acid molecule or polynucleotide in a starting population of nucleic acid molecules having a target sequence whose presence, amount, and/or nucleotide sequence, or changes in one or more of these, are desired to be determined. In general, the term "target sequence" refers to a nucleic acid sequence on a single strand of nucleic acid. The target sequence may be a portion of a gene, a regulatory sequence, genomic DNA, cDNA, RNA including mRNA, miRNA, rRNA, or others. The target sequence may be a target sequence from a sample or a secondary target such as a product of an amplification reaction. A target polynucleotide is not necessarily any single molecule or sequence. For example, a target polynucleotide may be any one of a plurality of target polynucleotides in a reaction, or all polynucleotides in a given reaction, depending on the reaction conditions. For example, in a nucleic acid amplification reaction with random primers, all polynucleotides in a reaction may be amplified. As a further example, a collection of targets may be simultaneously assayed using polynucleotide primers directed to a plurality of targets in a single reaction. As yet another example, all or a subset of polynucleotides in a sample may be modified by the addition of a primer-binding sequence (such as by the ligation of adapters containing the primer binding sequence), rendering each modified polynucleotide a target polynucleotide in a reaction with the corresponding primer polynucleotide(s).

As used herein, the term "flow cell" refers to the reaction vessel in a nucleic acid sequencing device. The flow cell is typically a glass slide containing small fluidic channels (e.g., a glass slide 75 mm×25 mm×1 mm having one or more channels), through which sequencing solutions (e.g., polymerases, nucleotides, and buffers) may traverse. Though typically glass, suitable flow cell materials may include polymeric materials, plastics, silicon, quartz (fused silica), Borofloat® glass, silica, silica-based materials, carbon, metals, an optical fiber or optical fiber bundles, sapphire, or plastic materials such as COCs and epoxies. The particular material can be selected based on properties desired for a particular use. For example, materials that are transparent to a desired wavelength of radiation are useful for analytical techniques that will utilize radiation of the desired wavelength. Conversely, it may be desirable to select a material that does not pass radiation of a certain wavelength (e.g., being opaque, absorptive, or reflective). In embodiments, the material of the flow cell is selected due to the ability to conduct thermal energy. In embodiments, a flow cell includes inlet and outlet ports and a flow channel extending therebetween.

Several examples herein are demonstrated for a rectangular flow cell having elongated channels. The flow cell is not intended to be limited to any particular size, though typical flow cells are about 75 mm×25 mm. The depth (i.e., the thickness) of the flow cell depends on the particular use, for example the flow cell may be about 75 mm×25 mm×0.5-2.0 mm. In embodiments, the flow cell is capable of being removed from the flow cell carrier. In embodiments, the flow cell is permanently affixed to the flow cell carrier. Flow cells may have one or more fluidic channels in which a polynucleotide is displayed (e.g., wherein polynucleotides are directly attached to the flow cell or wherein the polynucleotides are attached to one or more beads arrayed upon or within a flow cell channel) and can be comprised of glass, silicon, plastic, or various combinations thereof. In embodiments, the flow cell can include different numbers of channels (e.g., 1 channel, 2 or more channels, 4 or more channels, or 6, 8, 16 or more channels, etc.). Additionally, the flow cell can include channels of different depths and/or widths (different both between channels in different flowcells and different between channels within the same flow cell). For example, while the channels may be 50 μm deep, 100 μm deep, or 500 μm deep. Flow cells typically hold a sample (e.g., a plurality of nucleic acid clusters) along a surface for imaging by an external imaging system. Flow cells provide a convenient format for housing an array of nucleic acids that is subjected to a sequencing-by-synthesis (SBS) or other sequencing technique that involves repeated delivery of reagents in cycles. Examples of flowcells and related fluidic systems and detection platforms that can be readily used in the methods of the present disclosure are described, for example, in Bentley et al., Nature 456:53-59 (2008). Alternatively, in embodiments, the flow cell includes a plurality of open wells (e.g., wells of a multi-well plate, surface of a chip, or surface of a sheet).

In embodiments, the flow cell includes one or more channels each having at least one transparent window. In particular embodiments, the window can be transparent to radiation in a particular spectral range including, but not limited to x-ray, ultraviolet (UV), visible (VIS), infrared (IR), microwave and/or radio wave radiation. In embodiments, one or more windows can provide a view to an internal substrate to which polynucleotides are attached. Exemplary flow cells and physical features of flow cells that can be useful in a method or apparatus set forth herein are described, for example, in US 2010/0111768, US 2011/0059865 or US 2012/0270305, each of which is incorporated herein by reference in its entirety.

As used herein, the term "channel" refers to a passage in or on a substrate material that directs the flow of a fluid. A channel may run along the surface of a substrate, or may run through the substrate between openings in the substrate. A channel can have a cross section that is partially or fully surrounded by substrate material (e.g., a fluid impermeable substrate material). For example, a partially surrounded cross section can be a groove, trough, furrow or gutter that inhibits lateral flow of a fluid. The transverse cross section of an open channel can be, for example, U-shaped, V-shaped, curved, angular, polygonal, or hyperbolic. A channel can have a fully surrounded cross section such as a tunnel, tube, or pipe. A fully surrounded channel can have a rounded, circular, elliptical, square, rectangular, or polygonal cross section. In particular embodiments, a channel can be located in a flow cell, for example, being embedded within the flow cell. A channel in a flow cell can include one or more windows that are transparent to light in a particular region of the wavelength spectrum. In embodiments, the channel contains one or more polymers of the disclosure. In embodiments, the channel is filled by the one or more polymers, and flow through the channel (e.g., as in a sample fluid) is directed through the polymer in the channel. In embodiments, the channel contains a gel. The term "gel" in this context refers to a semi-rigid solid that is permeable to liquids and gases. Exemplary gels include, but are not limited to, those having a colloidal structure, such as agarose; polymer mesh structure, such as gelatin; or crosslinked polymer structure, such as polyacrylamide or a derivative thereof. Analytes, such as polynucleotides, can be attached to a gel or polymer material via covalent or non-covalent means. Exemplary methods and reactants for attaching nucleic acids to gels are described, for example, in US 2011/0059865 which is incorporated herein by reference. The analytes can be nucleic acids and the nucleic acids can be attached to the gel or polymer via their 3' oxygen, 5' oxygen, or at other locations along their length such as via a base moiety of the 3' terminal nucleotide, a base moiety of the 5' nucleotide, and/or one or more base moieties elsewhere in the molecule. In embodiments, the shape of the channel can include sides that are curved, linear, angled or a combination thereof. Other channel features can be linear, serpentine, rectangular, square, triangular, circular, oval, hyperbolic, or a combination thereof. The channels can have one or more branches or corners. The channels can connect two points on a substrate, one or both of which can be the edge of the substrate. The channels can be formed in the substrate material by any suitable method. For example, channels can be drilled, etched, or milled into the substrate material. In embodiments, the channels of the flow cell can be formed in the substrate material prior to bonding multiple layers together. Alternatively, or additionally, the channels can be formed after bonding layers together. It is not intended that the channel be limited to the dimensions of the lane or channel. For example, in embodiments the width is between 1 and 5 mm, with the length between and 100 mm; where the lane or channel has depth, it is between 10-300 microns, (e.g., between and 150 microns deep). The dimensions can be adjusted based on the size of the reaction chamber and desired area to be imaged. For example, in embodiments the size of the reaction chamber or flow cell is dimensioned so that the area to be imaged is less than the size of a standard microscope slide (i.e. less than 75 mm×25 mm) or considerably less (e.g., 35 mm×2.5 mm, or smaller).

In an embodiment, at least one channel has a cross sectional shape of a circle, rectangle, oval, or any other shape. Preferably, the flow rates, fluid viscosities, compositions, and geometries and sizes of the channel are selected so that fluid flow is laminar. Guidance for making such design choices is readily available publicly available resources, for example Acheson, Elementary Fluid Dynamics (Clarendon Press, 1990), and from software for modeling fluidics systems, e.g. SolidWorks from Dassault Systems. In an embodiment, at least one channel has passage cross-sections in the range of tens of square microns to a few square millimeters (e.g., maximal cross-sectional dimensions of from about 500 µm to about 0.1 µm). In an embodiment, the flow rates in the range of from a few nL/sec to a hundreds of µL/sec. In an embodiment, volume capacities in are the range of from 1 µm to a few nL, e.g. 10-100 nL.

As used herein, the term "substrate" refers to a solid support material. The substrate can be non-porous or porous. The substrate can be rigid or flexible. A nonporous substrate generally provides a seal against bulk flow of liquids or gases. Exemplary solid supports include, but are not limited to, glass and modified or functionalized glass, plastics (including acrylics, polystyrene and copolymers of styrene and other materials, polypropylene, polyethylene, polybutylene, polyurethanes, Teflon™, cyclic olefin copolymers, polyimides etc.), nylon, ceramics, resins, Zeonor, silica or silica-based materials including silicon and modified silicon, carbon, metals, inorganic glasses, optical fiber bundles, photopatternable dry film resists, UV-cured adhesives and polymers. Particularly useful solid supports for some embodiments have at least one surface located within a flow cell. The term "surface" is intended to mean an external part or external layer of a substrate. The surface can be in contact with another material such as a gas, liquid, gel, polymer, organic polymer, second surface of a similar or different material, metal, or coat. The surface, or regions thereof, can be substantially flat. The substrate and/or the surface can have surface features such as wells, pits, channels, ridges, raised regions, pegs, posts or the like. The term "well" refers to a discrete concave feature in a substrate having a surface opening that is completely surrounded by interstitial region (s) of the surface. Wells can have any of a variety of shapes at their opening in a surface including but not limited to round, elliptical, square, polygonal, or star shaped (i.e., star shaped with any number of vertices). The cross section of a well taken orthogonally with the surface may be curved, square, polygonal, hyperbolic, conical, or angular.

Where a range of values is provided, it is understood that each intervening value, to the tenth of the unit of the lower limit unless the context clearly indicates otherwise, between the upper and lower limit of that range, and any other stated or unstated intervening value in, or smaller range of values within, that stated range is encompassed within the invention. The upper and lower limits of any such smaller range (within a more broadly recited range) may independently be included in the smaller ranges, or as particular values themselves, and are also encompassed within the invention, subject to any specifically excluded limit in the stated range. Where the stated range includes one or both of the limits, ranges excluding either or both of those included limits are also included in the invention.

As used herein, the term "raised handle" refers to the appendage 120 that is elevated relative to the bottom of the frame 150. For example, when the frame 150 is in contact with a work surface (e.g., a table surface), the raised handle may be about 15 mm to about 25 mm from the surface. In embodiments, the raised handle is about 1, 2, 3, 4, 5, 6, 7, 8, 9, or 10 cm from the surface (for example when measured from the uppermost point or edge of the handle). In embodiments, the raised handle is about 5, 6, 7, 8, 9, 10, 11, 12, 13, 14, or 15 cm from the surface (for example when measured from the uppermost point or edge of the handle). In embodiments, the frame 150 is about 22 mm from the surface. The raised handle is operatively attached to the flow cell carrier so the user can grasp the flow cell carrier. In embodiments, the raised handle 120 does not make contact with the surface (aside from the attached frame 150 contact with the surface). A raised handle may be considered an ergonomic handle.

As used herein, the term "ergonomic handle" refers to an appendage 120 that is designed to improve efficiency, comfort, or safety. For example, an ergonomic handle may be designed such that a user can align their fingers on the handle in a manner that maximizes hand capacity and does not require wrist flexion, extension, or deviation, in order to allow the user to maintain a neutral wrist posture. The ergonomic handle may include additional features such as ridges, or other textures such as grooves, indentations, rippling, stippling, or the like, to improve grip. Alternatively, the ergonomic handle may further include a polymer or rubber coating (e.g., synthetic polymer, thermoplastic, or plastisol coating). The polymer or rubber coating may provide a flexible, non-slip cushion to further promote the ergonomic design of the handle.

The term "injection molded" is used in accordance with its ordinary meaning in the art and refers to a manufacturing process for producing parts by injecting hot (e.g., molten) material into a mold. Injection molding may be performed with a variety of input materials, such as metals, glasses, elastomers, confections, and polymers (e.g., thermoplastic and thermosetting polymers).

As used herein, the terms "sequencing", "sequence determination", "determining a nucleotide sequence", and the like include determination of a partial or complete sequence information (e.g., a sequence) of a polynucleotide being sequenced, and particularly physical processes for generating such sequence information. That is, the term includes sequence comparisons, consensus sequence determination, contig assembly, fingerprinting, and like levels of information about a target polynucleotide, as well as the express identification and ordering of nucleotides in a target polynucleotide. The term also includes the determination of the identification, ordering, and locations of one, two, or three of the four types of nucleotides within a target polynucleotide. In some embodiments, a sequencing process described herein comprises contacting a template and an annealed primer with a suitable polymerase under conditions suitable for polymerase extension and/or sequencing. The sequencing methods are preferably carried out with the target polynucleotide arrayed on a solid substrate within a flow cell (i.e., within a channel of the flow cell). In an embodiment, the sequencing is sequencing by synthesis (SBS). Briefly, SBS methods involve contacting target nucleic acids with one or more labeled nucleotides (e.g., fluorescently labeled) in the presence of a DNA polymerase. Optionally, the labeled nucleotides can further include a reversible termination property that terminates extension once the nucleotide has been incorporated. Thus, for embodiments that use reversible termination, a cleaving solution can be delivered to the flow cell (before or after detection occurs). Washes can be carried out between the various delivery steps. The cycle can then be repeated n times to extend the primer by n nucleotides, thereby detecting a sequence of length n. Exemplary SBS procedures and detection platforms that can be readily adapted for use with the methods of the present disclosure are described, for example, in Bentley et al., Nature 456:53-59 (2008), WO 2004/018497; and WO 2007/123744, each of which is incorporated herein by reference in its entirety. In an embodiment, sequencing is pH-based DNA sequencing. The concept of pH-based DNA sequencing, has been described in the literature, including the following references that are incorporated by reference: US2009/0026082; and Pourmand et al, Proc. Natl. Acad. Sci., 103: 6466-6470 (2006) which are incorporated herein by reference in their entirety. Other sequencing procedures that use cyclic reactions can be used, such as pyrosequencing. Sequencing-by-ligation reactions are also useful including, for example, those described in Shendure et al. Science 309:1728-1732 (2005).

A nucleic acid can be amplified by a suitable method. The term "amplified" and "amplification" as used herein refers to subjecting a target nucleic acid in a sample to a process that linearly or exponentially generates amplicon nucleic acids having the same or substantially the same (e.g., substantially identical) nucleotide sequence as the target nucleic acid, or segment thereof, and/or a complement thereof. In some embodiments an amplification reaction comprises a suitable thermal stable polymerase. Thermal stable polymerases are known in the art and are stable for prolonged periods of time, at temperature greater than 80° C. when compared to common polymerases found in most mammals. In certain embodiments the term "amplified" refers to a method that comprises a polymerase chain reaction (PCR). Conditions conducive to amplification (i.e., amplification conditions) are well known and often comprise at least a suitable polymerase, a suitable template, a suitable primer or set of primers, suitable nucleotides (e.g., dNTPs), a suitable buffer, and application of suitable annealing, hybridization and/or extension times and temperatures.

As used herein, the term "sequencing solution" is used in accordance with its plain and ordinary meaning and refers to an aqueous mixture that contains the reagents necessary to allow a dNTP or dNTP analogue to add a nucleotide to a DNA strand by a DNA polymerase. In embodiments, the sequencing reaction mixture includes a buffer. In embodiments, the buffer includes an acetate buffer, 3-(N-morpholino)propanesulfonic acid (MOPS) buffer, N-(2-Acetamido)-2-aminoethanesulfonic acid (ACES) buffer, phosphate-buffered saline (PBS) buffer, 4-(2-hydroxyethyl)-1-piperazineethanesulfonic acid (HEPES) buffer, N-(1,1-Dimethyl-2-hydroxyethyl)-3-amino-2-hydroxypropanesulfonic acid (AMPSO) buffer, borate buffer (e.g., borate buffered saline, sodium borate buffer, boric acid buffer), 2-Amino-2-methyl-1,3-propanediol (AMPD) buffer, N-cyclohexyl-2-hydroxyl-3-aminopropanesulfonic acid (CAPSO) buffer, 2-Amino-2-methyl-1-propanol (AMP) buffer, 4-(Cyclohexylamino)-1-butanesulfonic acid (CABS) buffer, glycine-NaOH buffer, N-Cyclohexyl-2-aminoethanesulfonic acid (CHES) buffer, tris(hydroxymethyl)aminomethane (Tris) buffer, or a N-cyclohexyl-3-aminopropanesulfonic acid (CAPS) buffer. In embodiments, the buffer is a borate buffer. In embodiments, the buffer is a CHES buffer. In embodiments, the sequencing reaction mixture includes nucleotides, wherein the nucleotides include a reversible terminating moiety and a label covalently linked to the nucleotide via a cleavable linker. In embodiments, the sequencing reaction mixture includes a buffer, DNA polymerase, detergent (e.g., Triton X), a chelator (e.g., EDTA), and/or salts (e.g., ammonium sulfate, magnesium chloride, sodium chloride, or potassium chloride).

As used herein, the term "kit" refers to any delivery system for delivering materials. In the context of reaction assays, such delivery systems include systems that allow for the storage, transport, or delivery of reaction reagents (e.g., oligonucleotides, enzymes, etc. in the appropriate containers), flow cells, flow cell carriers, and/or supporting materials (e.g., packaging, buffers, written instructions for performing a method, etc.) from one location to another. For example, kits include one or more enclosures (e.g., boxes) containing the relevant reaction reagents and/or supporting materials. As used herein, the term "fragmented kit" refers to a delivery system comprising two or more separate containers that each contain a subportion of the total kit components. The containers may be delivered to the intended recipient together or separately. For example, a first container may contain an enzyme for use in an assay, while a second container contains oligonucleotides. In contrast, a "combined kit" refers to a delivery system containing all of the components of a reaction assay in a single container (e.g., in a single box housing each of the desired components). The term "kit" includes both fragmented and combined kits.

The term "nucleic acid sequencing device" means an integrated system of one or more chambers, ports, and channels that are interconnected and in fluid communication and designed for carrying out an analytical reaction or process, either alone or in cooperation with an appliance or instrument that provides support functions, such as sample introduction, fluid and/or reagent driving means, temperature control, detection systems, data collection and/or integration systems, for the purpose of determining the nucleic acid sequence of a template polynucleotide. Nucleic acid sequencing devices may further include valves, pumps, and specialized functional coatings on interior walls. Nucleic acid sequencing devices may include a receiving unit, or platen, that orients the flow cell such that a maximal surface area of the flow cell is available to be exposed to an optical lens. An example flow cell receiving unit is described in co-pending U.S. Provisional Patent Application No. 62/952,790, entitled "FLOW CELL RECEIVER AND METHODS OF USE", which is incorporated herein by reference in its entirety. Other nucleic acid sequencing devices include those provided by Illumina™, Inc. (e.g. HiSeg™, MiSeg™, NextSeg™, or NovaSeg™ systems), Life Technologies™ (e.g. ABI PRISM™, or SOLiD™ systems), Pacific Biosciences (e.g. systems using SMRT™ Technology such as the Sequel™ or RS II™ systems), or Qiagen (e.g. Genereader™ system).

The term "platen" is used in accordance with its plain ordinary meaning and refers to a flat platform. The platform composition may include a substantially rigid material, for example, but not limited to, polymers, metals, inorganic oxide materials, such as glasses and sapphire-based materials, and ceramics. In embodiments, the platen includes a surface coating. Numerous surface coatings are possible, such as a polymer thin film, where the polymer may be selected from a range of physical and surface chemistry properties, such as, for example polyhalohydrocarbon, polystyrene, polyamide, polyimide and the like. Alternatively, a surface coating could be an inorganic coating, such as a silicon nitride, silicon carbide, silicon oxide, or diamond. In embodiments, a platen is a substantially planar platform.

The term "align" or "alignment" is used in accordance with its ordinary meaning and refers to perfect alignment and alignment with relatively small, insignificant amount of deviation/misalignment (e.g., ≤5%).

The terms "fluid communication" or "fluidically coupled" refers to two spatial regions being connected together such that a liquid or gas may flow between the two spatial regions.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

REFERENCES

Eltoukhy et al. U.S. Pat. No. 9,937,497
Reed et al. U.S. Pat. No. 8,951,781

What is claimed is:
1. A device comprising:
a reaction vessel comprising two or more channels; and
a frame, the frame comprising:
a handle;
a magnet wherein the magnet is at least one ferromagnetic pin;
wherein the frame is configured to retain the reaction vessel.
2. The device of claim 1, wherein the frame further comprises a pocket, the pocket comprising at least one biasing feature.
3. The device of claim 2, wherein the frame is configured to retain the reaction vessel within the pocket.
4. The device of claim 3, wherein the frame is configured to retain the reaction vessel within the pocket such that a maximal surface area of the reaction vessel is available to be exposed to an optical lens.
5. The device of claim 1, wherein the retaining of the reaction vessel within the pocket further comprises constraining a first, a second, a third, a fourth, a fifth, and a sixth degree of freedom of the reaction vessel.
6. The device of claim 1, wherein the frame is an injection molded frame.
7. The device of claim 1, wherein the handle is a raised handle.
8. The device of claim 1, wherein the frame is further configured to provide a gap between a work surface and the reaction vessel.
9. The device of claim 2, wherein the at least one biasing feature is a spring finger.
10. The device of claim 2, wherein the at least one biasing feature is a tab.
11. The device of claim 1, further comprising a microchip.
12. The device of claim 11, wherein the microchip is an electronically erasable programmable read only memory (EEPROM) chip.
13. The device of claim 1, wherein the reaction vessel comprises a plurality of inlet ports sized to receive a flow of one or more reagents and one or more enzymes for DNA amplification and a plurality of outlet ports that pass the flow of reagents out of the reaction vessel.

14. The device of claim 1, wherein the reaction vessel comprises
   a plurality of inlet ports sized to flow in the channel one or more reagents for DNA sequencing, and
   a plurality of outlet ports that pass the flow of reagents out of the reaction vessel.

15. The device of claim 1, wherein the device is configured to removably engage within a nucleic acid sequencing device.

16. The device of claim 1, wherein the ferromagnetic pin comprises an alloy containing iron, cobalt, or nickel and a metalloid.

17. The device of claim 1, wherein the reaction vessel comprises glass.

18. The device of claim 1, wherein the two or more channels each comprise a polymer.

\* \* \* \* \*